(12) United States Patent
Forthuber et al.

(10) Patent No.: US 11,441,410 B2
(45) Date of Patent: Sep. 13, 2022

(54) SYSTEM AND METHOD FOR OIL PRODUCTION SEPARATION

(71) Applicant: OXY USA INC., Houston, TX (US)

(72) Inventors: Frederick A. Forthuber, Houston, TX (US); Byron Griffin, Houston, TX (US); Ryan Littlefield, Houston, TX (US); David Garner, Houston, TX (US); Andres Sebastian Lopez, Katy, TX (US); Benjamin Hays, Plains, TX (US)

(73) Assignee: Oxy USA Inc., Houston, TX (US)

( * ) Notice: Subject to any disclaimer, the term of this patent is extended or adjusted under 35 U.S.C. 154(b) by 337 days.

(21) Appl. No.: 16/753,316

(22) PCT Filed: Oct. 5, 2018

(86) PCT No.: PCT/US2018/054533
§ 371 (c)(1),
(2) Date: Apr. 2, 2020

(87) PCT Pub. No.: WO2019/071082
PCT Pub. Date: Apr. 11, 2019

(65) Prior Publication Data
US 2020/0240255 A1  Jul. 30, 2020

Related U.S. Application Data

(60) Provisional application No. 62/569,160, filed on Oct. 6, 2017.

(51) Int. Cl.
*E21B 43/40* (2006.01)
*C10G 33/06* (2006.01)
(Continued)

(52) U.S. Cl.
CPC .......... *E21B 43/40* (2013.01); *B01D 17/0214* (2013.01); *B01D 17/0217* (2013.01);
(Continued)

(58) Field of Classification Search
CPC ... E21B 43/40; E21B 43/164; B01D 17/0214; B01D 17/0217; B01D 19/0068; C10G 33/06; C10G 2300/4012
See application file for complete search history.

(56) References Cited

U.S. PATENT DOCUMENTS

| 2,875,833 A | 3/1959 | Martin |
| 2011/0088897 A1* | 4/2011 | Raman ................. F25J 3/0252 166/267 |

(Continued)

FOREIGN PATENT DOCUMENTS

| WO | 2007/077137 A1 | 7/2007 |
| WO | 2011/076282 A1 | 7/2010 |

(Continued)

OTHER PUBLICATIONS

International Search Report and Written Opinion for related PCT/US2018/054533 dated Jan. 14, 2019.

*Primary Examiner* — Renee Robinson
(74) *Attorney, Agent, or Firm* — Renner, Kenner; Arthur M. Reginelli (57) ABSTRACT

A method of separating hydrocarbons from an oil field production stream may include providing a production stream having a gas phase and a liquid phase, the production stream including oil, hydrocarbon gas, carbon dioxide, and water; substantially separating the gas phase from the liquid phase; separating the liquid phase into a stream composed substantially of oil and a stream substantially composed of water, the stream substantially composed of water containing carbon dioxide absorbed therein; pressurizing the water stream containing carbon dioxide absorbed therein; and (Continued)

injecting the pressurized water stream containing carbon dioxide absorbed therein to a downhole injection location; the method may include operating each step at a pressure above 150 psig.

19 Claims, 7 Drawing Sheets

(51) Int. Cl.
*B01D 17/02* (2006.01)
*B01D 19/00* (2006.01)
*C02F 1/20* (2006.01)
*C02F 1/38* (2006.01)
*C10G 33/04* (2006.01)
*E21B 43/16* (2006.01)
*C02F 103/10* (2006.01)

(52) U.S. Cl.
CPC ............ *B01D 19/0068* (2013.01); *C02F 1/20* (2013.01); *C02F 1/38* (2013.01); *C10G 33/04* (2013.01); *C10G 33/06* (2013.01); *E21B 43/164* (2013.01); *C02F 2103/10* (2013.01); *C10G 2300/4012* (2013.01)

(56) References Cited

U.S. PATENT DOCUMENTS

2012/0067568 A1* 3/2012 Palmer .................... F23J 15/00
166/402
2017/0009561 A1 1/2017 Mokheimer et al.

FOREIGN PATENT DOCUMENTS

WO WO 2010/076282 * 7/2010 ............. E21B 43/16
WO 2012/118411 A2 9/2012

\* cited by examiner

SYSTEM AND METHOD FOR OIL PRODUCTION SEPARATION

CROSS-REFERENCE TO RELATED APPLICATIONS

This application is a National-Stage application of PCT/US2018/054533 filed on Oct. 5, 2018, which claims the benefit of U.S. Provisional Application Ser. No. 62/569,160 filed on Oct. 6, 2017, which are incorporated herein by reference.

FIELD OF THE INVENTION

Embodiments of the present invention relate to systems and methods for separating hydrocarbons from an oil field production stream.

BACKGROUND OF THE INVENTION

Figure 1:
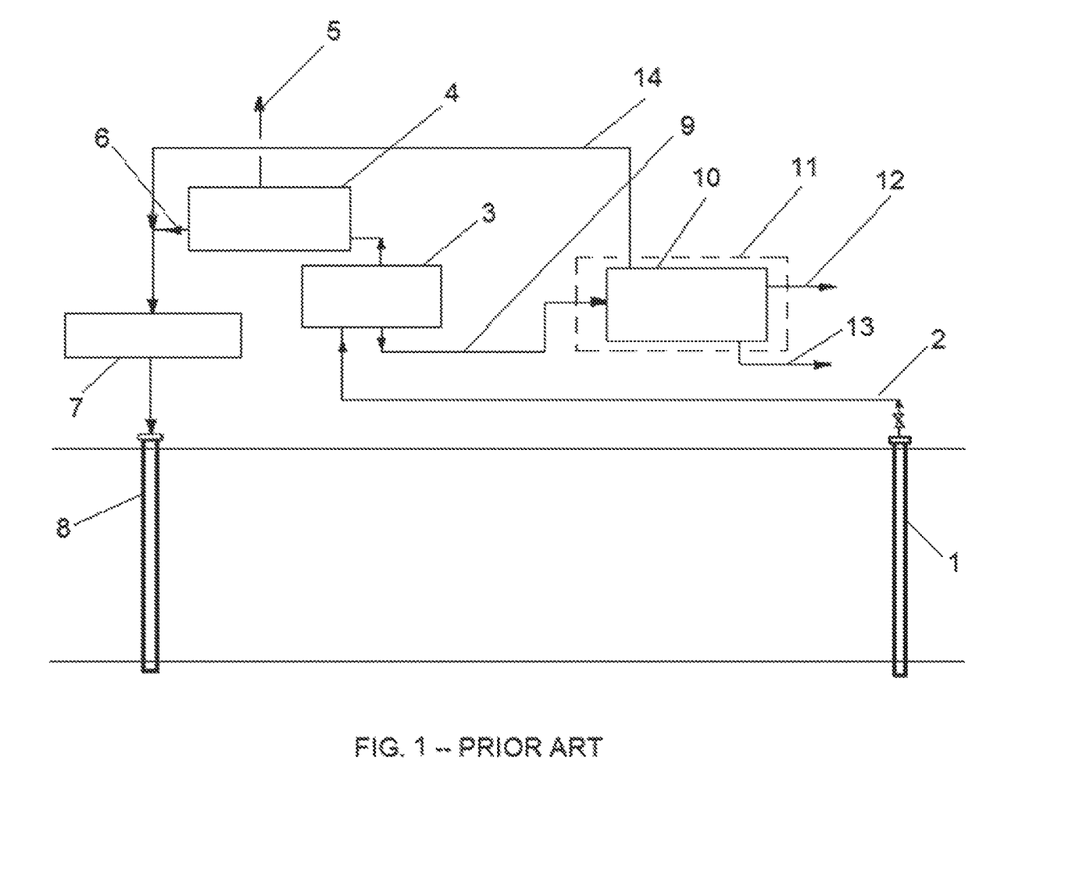
FIG. 1 is a flow chart of a prior art process.

With reference to Prior Art FIG. 1, oil and gas production wells 1 may produce a production stream 2 containing a mixture of gas and liquid. Stream 2 is typically treated within a liquid-gas separator 3 to separate the gas phase, which may include carbon dioxide and hydrocarbons, from a liquid phase, which may include an immiscible mixture of water and oil.

Subsequent processes 4 may be employed to separate and capture useful hydrocarbons via gaseous hydrocarbon stream 5. The carbon dioxide can likewise be isolated from the other gases to form carbon dioxide stream 6. Carbon dioxide stream 6 can then be pressurized via compressor 7 and subsequently injected into an injection well 8.

The liquid-phase stream 9, particularly the water phase thereof, may include significant amounts of carbon dioxide, especially where production stream 2 is produced using enhanced oil recovery production techniques. Notably, liquid stream 9, particularly the water, may include about 130 standard cubic foot or more per barrel (scf/BBL) carbon dioxide dissolved or otherwise absorbed therein.

Liquid-phase stream 9 may then be routed to one or more gravity separation tanks 10, which may be included within a tank battery 11, where gravity separates the immiscible mixture into an oil stream 12 and a water stream 13. Additionally, since this gravity separation takes place at or near atmospheric pressure, the carbon dioxide dissolved or otherwise absorbed in the water is released. This carbon dioxide may be collected as carbon dioxide stream 14 and joined with carbon dioxide stream 6, and then pressurized, via compressor 7, for subsequent injection into injection well 8.

In lieu of or in addition to gravity separation, one or more centrifuges and hydrocyclones (not shown in FIG. 1) may also be used to treat the immiscible liquid stream 9 and thereby separate the oil from water, especially in offshore operations. These separation techniques operate only at pressures sufficient to drive the centrifugal separation, e.g. 125 psig. Moreover, these processes are understood to remove a gas-phase stream prior to separating oil from water. This results in there being minimal, if any, carbon dioxide in the water phase that is ultimately obtained.

SUMMARY OF THE INVENTION

A method of separating hydrocarbons from an oil field production stream includes providing a production stream having a gas phase and a liquid phase, the production stream including oil, hydrocarbon gas, carbon dioxide, and water; separating the gas phase from the liquid phase; separating the liquid phase into an oil stream and a water stream, the water stream containing carbon dioxide absorbed therein; pressurizing the water stream containing carbon dioxide absorbed therein; and injecting the pressurized water stream containing carbon dioxide absorbed therein to a downhole injection location; wherein the method includes operating each step at a pressure above 150 psig.

A method of separating hydrocarbons from an oil field production stream includes providing a production stream having a gas phase and a liquid phase, the production stream including oil, hydrocarbon gas, carbon dioxide, and water; providing the production stream to a gas-liquid separator to separate the gas phase from the liquid phase, the separated liquid phase including oil and water, the water having carbon dioxide gas absorbed therein; providing the separated liquid phase to a liquid-liquid separator to separate the oil from the water, to form a water stream having the carbon dioxide absorbed therein; providing the water stream having the carbon dioxide absorbed therein to an injection pump to form a pressurized water stream; and providing the pressurized water stream to an injection well; wherein the method includes operating each step at a pressure above 150 psig.

DETAILED DESCRIPTION OF ILLUSTRATIVE EMBODIMENTS

Embodiments of the present invention are based, at least in part, on the discovery of systems and methods that include utilizing sufficient operating pressure on a water-containing hydrocarbon production stream during separation processes. Namely, during the process of separating targeted hydrocarbons from the other constituents within the production stream, such as the water, the operating pressures of the various streams are at relatively high pressures to thereby retain appreciable amounts of carbon dioxide within the water phase. It has been advantageously discovered that by retaining appreciable levels of carbon dioxide within the water phase of the production stream, several efficiencies can be achieved. For example, the collection and re-pressurization of the carbon dioxide can be avoided, and the outlet water stream containing the carbon dioxide can be injected into injection locations as a carbon dioxide/water mixture for sequestration or subsequent oil field production. Advantageously, embodiments of the present invention provide a process whereby a significant amount of the total carbon dioxide within a hydrocarbon production stream can be retained within the water phase for eventual downhole injection.

Process Overview

Figure 2:
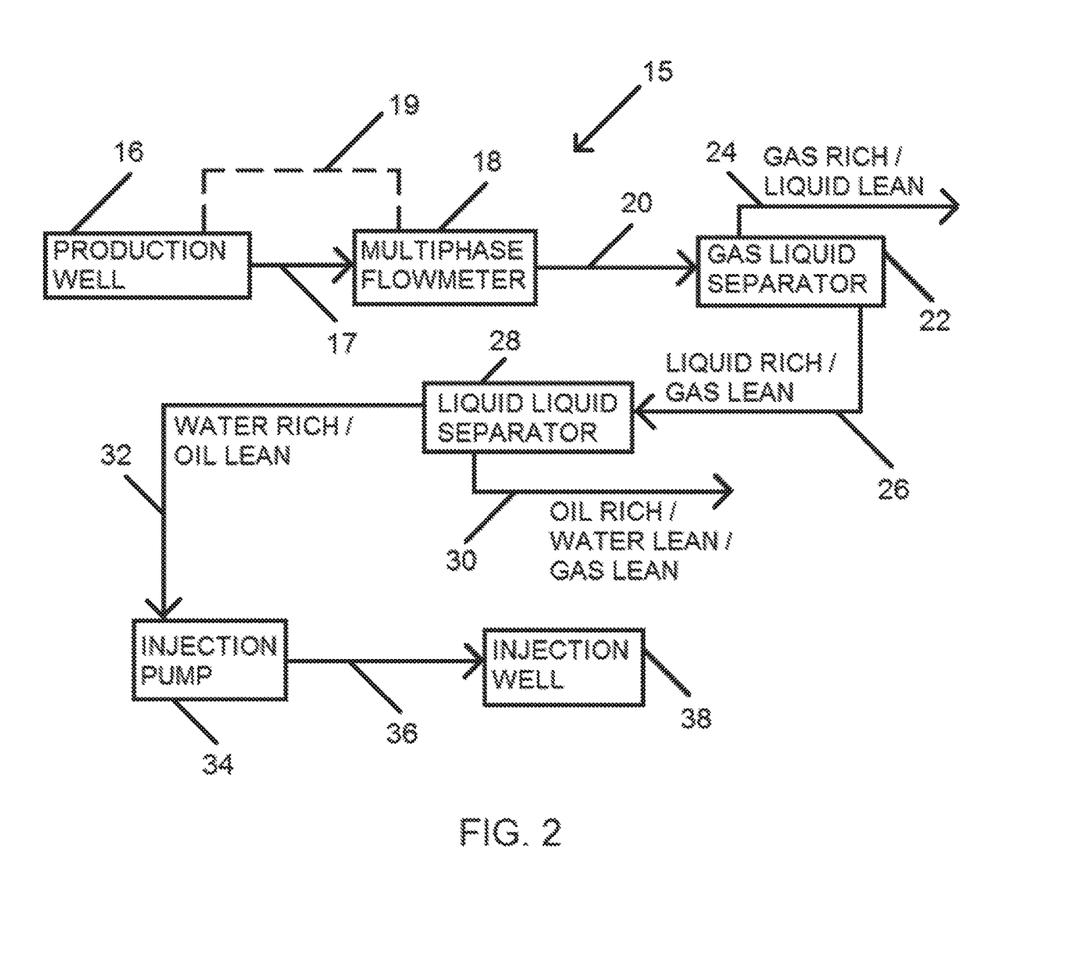
FIG. 2 is a flow chart showing one or more embodiments of the invention.

With reference to FIG. 2, one or more embodiments of the invention include a separation process 15, which may also be referred to as a dewatering process 15 or a carbon dioxide reinjection process 15. Dewatering process 15 may include one or more oil and gas production wells 16 providing a multiphase production stream 17. Oil and gas production wells 16 produce a multiphase production stream 17 that is generally a mixture of hydrocarbons (e.g. one or more of gas, condensate, and oil), water (which may further include dissolved minerals, such as salt), other gases (e.g. nitrogen, carbon dioxide ($CO_2$), hydrogen sulfide ($H_2S$)), and solids (e.g. sand and scale). As used herein, hydrocarbon gas generally refers to those hydrocarbon compounds that are gaseous at room temperature and pressure (e.g. methane, ethane, propane, butane), or that will separate within a gas-rich stream from a gas liquid separator at a particular operating temperature and pressure. As used herein, hydrocarbon oil, which may be referred to as "oil," generally refers to those hydrocarbon compounds that are liquid at room temperature and pressure (e.g. generally pentane ($C_5H_{12}$) through heptadecane ($C_{17}H_{36}$)), or that will separate within a liquid-rich stream from a gas liquid separator at a particular operating temperature and pressure.

In certain embodiments, multiphase production stream 17 may pass through an optional multiphase flowmeter 18, which provides a signal 19 back to one or more production wells 16. Multiphase flowmeter 18, which may be programmed to account for the capacity of dewatering process 15, may provide signal 19 to one or more production wells 16 in order to maintain an appropriate flow rate for multiphase production stream 17. Multiphase flowmeter 18 may be utilized to shut down one or more production wells 16 if the production flow from one or more production wells 16 overwhelms process 15. Since multiphase flowmeter 18 is optional, one or more embodiments do not include multiphase flowmeter 18 and the flow from one or more production wells 16 is regulated in an alternative manner.

Stream 20 exiting multiphase flowmeter 18, where present, may be provided to one or more gas-liquid separators 22, which may also be referred to as production separators 22. This step of providing stream 20 to one or more production separators 22 may be referred to as a degassing step. One or more production separators 22 should be designed with a sufficient size for functions of allowing free gases to separate out and the ability to handle upstream pressure fluctuations.

One or more gas-liquid separators 22 separate stream 20 into a gas-rich, liquid-lean stream 24 and a liquid-rich, gas-lean stream 26. Gas-rich, liquid-lean stream 24 may be referred to as gas-phase stream 24 and liquid-rich, gas-lean stream 26 may be referred to as liquid-phase stream 26. Gas-phase stream 24 may be provided to a gas gathering system (not shown in FIG. 2) for further processing and utilization. The flow of gas-phase stream 24 and liquid-phase stream 26 may be controlled based on one or more gas-liquid separators 22 including a liquid level sensor (not shown in FIG. 2) for measuring the liquid level in one or more gas-liquid separators 22. Liquid level sensor sends a signal to a controller (not shown in FIG. 2) in communication therewith, which is capable of closing or opening a gas valve (not shown in FIG. 2) controlling the flow of gas-phase stream 24. A process control strategy may be utilized for controlling the gas valve and/or a liquid valve (not shown in FIG. 2) on liquid-phase stream 26 to maintain the liquid level in one or more gas-liquid separators 22 at a desired set point.

Liquid-phase stream 26 is provided to one or more liquid-liquid separators 28, which separate liquid-phase stream 26 into an oil-rich, water-lean, gas-lean stream 30 and a water-rich, oil-lean stream 32. This step of providing of liquid-phase stream 26 to one or more liquid-liquid separators 28 may be referred to as a dewatering step. Oil-rich, water-lean, gas-lean stream 30 may be referred to as oil stream 30 and water-rich, oil-lean stream 32 may be referred to as water stream 32. Oil-rich, water-lean, gas-lean stream 30 may be provided to a tank battery (not shown in FIG. 2) for further steps of separating water from oil and subsequently utilizing the oil as a crude oil stream. This further step of separating water from oil in stream 30 may be referred to as a polishing separation step. Water-rich, oil-lean stream 32 may be provided to one or more injection pumps 34 for injecting a pressurized stream 36 into one or more injection wells 38.

It should be appreciated that the use of certain descriptive terms used herein (e.g. "oil-rich, water-lean, gas-lean;" "oil stream;" "water-rich, oil-lean") are generally related to the operating step to which these streams are immediately connected. The descriptors utilized for certain streams (e.g. "oil-rich, water-lean, gas-lean" stream 30) are generally relative to the inlet stream (e.g. "liquid-rich, gas-lean" stream 26) and other outlet streams (e.g. "water-rich, oil-lean" stream 32). Indeed, in certain embodiments, streams referred to herein as "oil-rich, water-lean, gas-lean" streams (e.g. stream 30) may include up to 50 vol. % water, and in other embodiments, up to 75 vol. % water.

As discussed above, embodiments of separation process 15 retain significant levels of the carbon dioxide that is within liquid-rich, gas-lean stream 26 within pressurized stream 36. That is, based on the elevated operation pressure of process 15, an appreciable amount of the carbon dioxide contained within liquid-rich, gas-lean stream 26 remains in stream 36 such that the retained carbon dioxide can be subsequently injected into one or more injection wells 38. As the skilled person appreciates, the carbon dioxide in a liquid-rich stream (e.g. streams 26, 36) is absorbed or dissolved in the liquid. Though the carbon dioxide content of liquid-rich, gas-lean stream 26 may vary based on the composition of stream 17 and the process conditions of process 15, embodiments of process 15 retain a significant amount of the carbon dioxide from stream 26 within stream 36 for injection. As used herein, the term retain, which may also be referred to as maintained, may be defined as an outlet stream (e.g. stream 36) containing a predetermined amount of the carbon dioxide originally contained within an inlet stream (e.g. stream 26), after processing the inlet stream. In one or more embodiments, 70% or more, in other embodiments, 80% or more, in other embodiments, 90% or more, in other embodiments, 92% or more, and in other embodiments, 94% or more, of the carbon dioxide in stream 26 is retained in pressurized stream 36. In these or other embodiments, up to 96% of the carbon dioxide in stream 26 is retained in pressurized stream 36. Any of the above endpoint numbers may be utilized to form suitable ranges.

In one or more embodiments, the elevated operation pressure of process 15 that gives rise to the advantageous amount of carbon dioxide retained in stream 36 may include the operating pressure of the production stream (i.e. stream 17 continuing to stream 36) staying above a predetermined pressure. In one or more embodiments, the operating pressure of the production stream (i.e. stream 17 continuing to stream 36) is above 150 psig, in other embodiments, above 200 psig, and in other embodiments, above 250 psig, throughout the entirety of separation process 15. These elevated pressures serve to retain a desired amount of the carbon dioxide in multiphase production stream 17 and stream 26 within pressurized stream 36. The desired amount of carbon dioxide retained within pressurized stream 36 may be defined in terms of standard cubic feet carbon dioxide (scf) per barrels (BBL) of total liquid fluid (e.g. water) (scf/BBL). In one or more embodiments, pressurized stream 36 is a water stream having 80 or more scf/BBL, in other embodiments, 95 or more scf/BBL, in other embodiments, 110 or more scf/BBL, in other embodiments, 120 or more scf/BBL, and in other embodiments, 130 or more scf/BBL, carbon dioxide absorbed therein. In these or other embodiments, pressurized stream 36 is a water stream having 150 or less scf/BBL, in other embodiments, 140 or less scf/BBL, in other embodiments, 120 or less scf/BBL, and in other embodiments, 100 or less scf/BBL, carbon dioxide absorbed therein. Any of the above end-point numbers, and end-point numbers discussed elsewhere herein, may be utilized to form suitable ranges.

Figure 7:
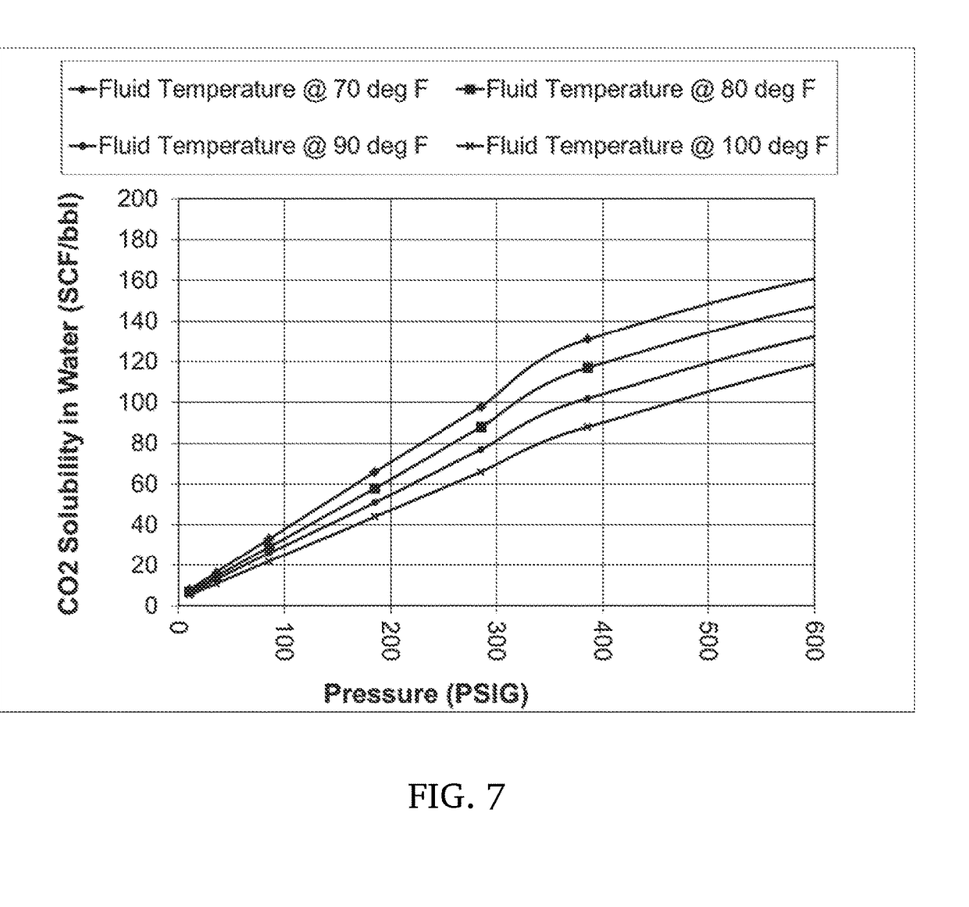
FIG. 7 is a graph showing solubility of carbon dioxide in water at various pressures and temperatures.

It should be appreciated that the amount of carbon dioxide absorbed within a particular stream (e.g. stream 36) will be affected by the operating temperature and pressure of that stream. In this regard, FIG. 7 provides a graph of the solubility of carbon dioxide in water at various pressures and temperatures. FIG. 7 shows that more carbon dioxide is absorbed in water at higher pressures. This gives rise to the advantages of the present invention discussed herein as compared to prior art processes utilizing lower (e.g. atmospheric) operating pressures, especially for liquid-liquid separations.

Based on the elevated operating pressures giving rise to certain advantages of the present invention, one or more embodiments of separation process 15 may be devoid of a step of separating out a carbon dioxide stream at atmospheric pressure or pressures approximate thereto, as utilized in certain prior art processes. Based on the elevated operating pressures enabling a significant amount of the carbon dioxide in multiphase production stream 17 and stream 26 to be retained within pressurized stream 36 and subsequently injected into one or more injection wells 38, one or more embodiments of separation process 15 may be devoid of accumulating or storing water, or at least a significant amount of water, above ground, as utilized in certain prior art processes.

Process Overview—Specific Embodiment

Figure 3:
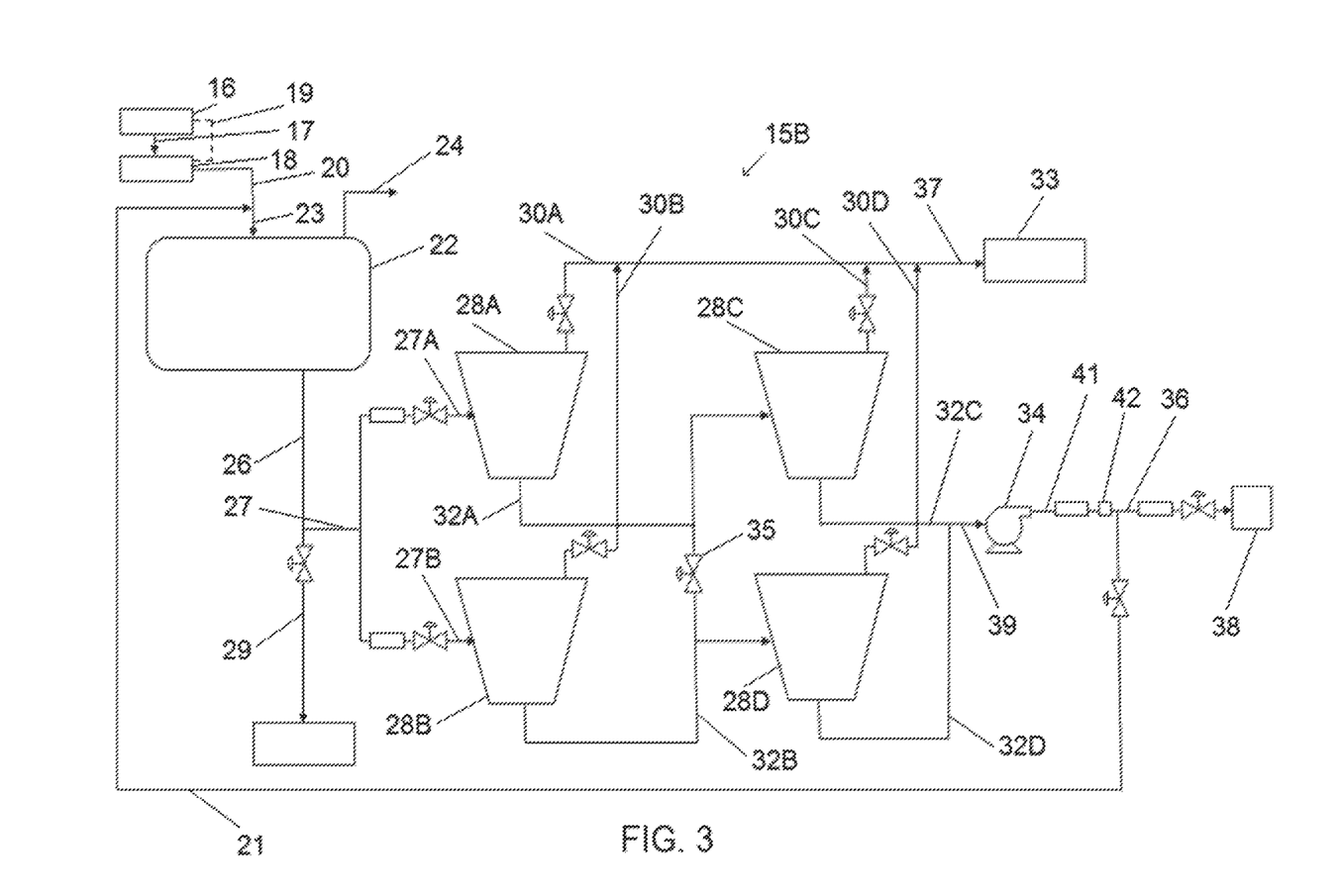
FIG. 3 is a flow chart showing one or more embodiments of the invention.

With reference to FIG. 3, one or more embodiments of the invention include a separation process 15B, which may also be referred to as a dewatering process 15B or a carbon dioxide reinjection process 15B. Dewatering process 15B may include one or more oil and gas production wells 16 providing a multiphase production stream 17. One or more oil and gas production wells 16 produce a multiphase production stream 17 that is generally a mixture of hydrocarbons (e.g. one or more of gas, condensate, and oil), water (which may further include dissolved minerals, such as salt), other gases (e.g. nitrogen, carbon dioxide ($CO_2$), hydrogen sulfide ($H_2S$)), and solids (e.g. sand and scale). Exemplary oil and gas production wells 16 include those that include high pressure, electric submersible pumps (ESP).

In certain embodiments, one or more oil and gas production wells 16 may be located in an oil reservoir that is subjected to carbon dioxide flooding. Carbon dioxide flooding is a process whereby carbon dioxide is injected into an oil reservoir in order to increase oil output. In other embodiments, one or more oil and gas production wells 16 may be located in an oil reservoir that is subjected to water flooding, whereby water is injected into an oil reservoir in order to increase oil output.

The pressure of one or more production wells 16 and multiphase production stream 17 provided therefrom may vary based on the conditions of one or more production wells 16. The pressure of multiphase production stream 17 may, for example, be in a range of from 400 psig to 750 psig, and in other embodiments, from 450 psig to 700 psig. Other pressures of multiphase production stream 17 may be suitable. Similarly, the flow rate of multiphase production stream 17 may vary based on the conditions of one or more production wells 16. In one or more embodiments, multiphase production stream 17 has a flow rate of from about 30,000 BPD (barrels per day) to about 70,000 BPD, in other embodiments, from about 40,000 BPD to about 60,000 BPD, and in other embodiments, from about 45,000 BPD to about 55,000 BPD. In one or more embodiments, multiphase production stream 17 has a flow rate of about 50,000 BPD. Other flow rates of multiphase production stream 17 may be suitable.

With reference again to FIG. 3, in certain embodiments, multiphase production stream 17 may pass through an optional multiphase flowmeter 18, which provides a signal 19 back to one or more production wells 16. An exemplary signal 19 is a program logic controller (PLC). Multiphase flowmeter 18, which may be programmed to account for the capacity of dewatering process 15B, may provide signal 19 to one or more production wells 16 in order to maintain an appropriate flow rate for multiphase production stream 17. Multiphase flowmeter 18 may be utilized to shut down one or more production wells 16 if the production flow from one or more production wells 16 overwhelms process 15B. Suitable devices for multiphase flowmeter 18 are generally known in the art as those devices capable of measuring the individual phase flow rates of constituent phases in a given flow. Exemplary multiphase flowmeters 18 may utilize one or more of infrared radiation, fluorescence, conductivity properties, and vibration. Since multiphase flowmeter 18 is optional, one or more embodiments do not include multiphase flowmeter 18 and the flow from one or more production wells 16 is regulated in an alternative manner.

In certain embodiments, stream 20 exiting multiphase flowmeter 18 joins with a recycle stream 21, which will be discussed further herein below, to form an inlet stream 23 to one or more gas-liquid separators 22. This step of providing inlet stream 23 to one or more gas-liquid separators 22 may be referred to as a degassing step. One or more gas-liquid separators 22 separate stream 23 into a gas-rich, liquid-lean stream 24 (also referred to as gas-phase stream 24) and a liquid-rich, gas-lean stream 26. Gas-phase stream 24 may be provided to a gas gathering system (not shown in FIG. 3) for further processing and utilization. One or more gas-liquid separators 22 may include a liquid level sensor as discussed above with respect to FIG. 2.

Gas-liquid separator 22, which may be referred to as vessel 22, is generally known in the art as an apparatus capable of separating a gas phase from a liquid phase. Gas-liquid separator 22 may be horizontal, vertical, or spherical. Gas-liquid separator 22 may be designed for any suitable size. An exemplary size for gas-liquid separator 22 is a diameter of about 7 feet and a length of about 25 feet. One or more gas-liquid separators 22 may be characterized by separation efficiency of the gas phase from the liquid phase. In one or more embodiments, one or more gas-liquid separators 22 separate at least 95% of gas in inlet stream 23 into the outlet overhead gas-phase stream 24 from one or more gas-liquid separators 22. The outlet gas-phase stream 24 may be referred to as the free gas in stream 23 at the operating pressure of one or more gas-liquid separators 22. The gas remaining in the liquid-rich, gas-lean stream 26 may be referred to as entrained gas at operating pressure. As generally known, gas-liquid separators 22 have a maximum allowable working pressure (MAWP) generally defining the upper limit of operating pressure thereof. When the pressure of stream 17 or stream 23 is above the MAWP of one or more gas-liquid separators 22, stream 17 or stream 23 may undergo a pressure reduction step. This may be accomplished by passing stream 17 or stream 23 through a choke valve (not shown in FIG. 3). As generally known to the skilled person, the MAWP of one or more gas-liquid separators 22 and whether a pressure reduction step is utilized may be designed based on economics and operating conditions of process 15B.

Liquid-rich, gas-lean stream 26 may be referred to as a high-water-content stream 26 or liquid-phase stream 26, particularly when one or more oil and gas production wells 16 are located in an oil reservoir subjected to water flooding. In one or more embodiments, liquid-phase stream 26 may have a water content of 90 vol. % or more, in other embodiments, 95 vol. % or more, in other embodiments, 97 vol. % or more. In these or other embodiments, stream 26 has a water composition of 99 vol. % or less, in other embodiments, 98 vol. % or less, in other embodiments, 97.5 vol. % or less. Any of these end-point numbers may be utilized to form suitable ranges.

Liquid-phase stream 26 may be split into a tank battery stream 29 and a centrifugal separation stream 27, which may also be referred to as a water-removal stream 27. In certain embodiments, tank battery stream 29 may be provided to a tank battery for the particular function of preventing centrifugal separation stream 27 from exceeding the capacity of the downstream components. In certain embodiments, centrifugal separation stream 27 may be split into a first centrifugal separation stream 27A and a second centrifugal separation stream 27B. Centrifugal separation stream 27 may also be entirely provided as one of stream 27A and stream 27B, as process operations (e.g. scheduled maintenance) require. Centrifugal separation stream 27A, which may also be referred to as liquid-phase stream 27A, is provided to a centrifugal separator 28A, which may also be referred to as a first dewaterer 28A or liquid-liquid separator 28A. Centrifugal separation stream 27B, which may also be referred to as liquid-phase stream 27B, is provided to a centrifugal separator 28B, which may also be referred to as a second dewaterer 28B or liquid-liquid separator 28B.

Dewaterer 28A separates liquid-phase stream 27A into an oil-rich, water-lean, gas-lean stream 30A and a water-rich, oil-lean stream 32A. Dewaterer 28B separates liquid-phase stream 27B into an oil-rich, water-lean, gas-lean stream 30B and a water-rich, oil-lean stream 32B. Oil-rich, water-lean, gas-lean streams 30A, 30B may be referred to as oil streams 30A, 30B and water-rich, oil-lean streams 32A, 32B may be referred to as water streams 32A, 32B. Oil-rich, water-lean, gas-lean streams 30A, 30B may be provided to a tank battery 33 for further separation of water and utilization of the oil as a crude oil stream.

With further reference to FIG. 3, water-rich, oil-lean streams 32A, 32B exit dewaterers 28A, 28B and are provided to a second stage of centrifugal separation at centrifugal separators 28C, 28D. Water-rich, oil-lean stream 32A may be provided to a centrifugal separator 28C, which may also be referred to as first hydrocyclone 28C or liquid-liquid separator 28C. Water-rich, oil-lean stream 32B may be provided to a centrifugal separator 28D, which may also be referred to as second hydrocyclone 28D or liquid-liquid separator 28D. Hydrocyclone 28C separates water-rich, oil-lean stream 32A into a further oil-rich, water-lean, gas-lean stream 30C and a further water-rich, oil-lean stream 32C. Hydrocyclone 28D separates water-rich, oil-lean stream 32B into a further oil-rich, water-lean, gas-lean stream 30D and a further water-rich, oil-lean stream 32D.

Based on the above discussion, it should be appreciated that certain embodiments provide a first-stage liquid-liquid separation step (i.e. liquid-liquid separators 28A, 28B) in sequence with a second-stage liquid-liquid separation step (i.e. liquid-liquid separators 28C, 28D). This sequential staging of the liquid-liquid separation steps may advantageously allow the first-stage liquid-liquid separation step to separate out most of the oil in an inlet stream, with the second-stage liquid-liquid separation step separating out most of the remaining oil left after the first stage. Thus, the first-stage liquid-liquid separation may be referred to as a bulk water removal step and the second-stage liquid-liquid separation may be referred to as a water removal polishing step. The first-stage liquid-liquid separation step (i.e. liquid-liquid separators 28A, 28B) may therefore be designed to account for this bulk removal and the second-stage liquid-liquid separation step (i.e. liquid-liquid separators 28C, 28D) may be designed to account for the polishing function. Describing the bulk removal step and the polishing step in another manner, using 100% as a basis for the amount of oil present within an inlet stream (e.g. stream 27) to the first-stage liquid-liquid separation step, the first-stage liquid-liquid separation step may remove about 98% of the oil in the inlet stream (e.g. stream 27), the second-stage liquid-liquid separation step may remove about 1.97% of the oil in the inlet stream (e.g. stream 27), and less than 0.03% of the oil in the inlet stream (e.g. stream 27) may remain in the outlet stream of the second-stage liquid-liquid separation step (e.g. stream 39). Therefore, as generally known in the art, and as recited above, the first-stage liquid-liquid separators 28A, 28B may be referred to as dewaterers 28A, 28B and the second-stage liquid-liquid separators 28C, 28D may be referred to as hydrocyclones 28C, 28D.

Generically describing all liquid-liquid separators (i.e. dewaterers 28A, 28B and hydrocyclones 28C, 28D), liquid-liquid separators are generally known in the art as those apparatuses that are capable of separating a first liquid phase (e.g. oil) from a second liquid phase (e.g. water). Exemplary liquid-liquid separators include centrifugal separation systems, such as the above-mentioned dewaterers and hydrocyclones. Other exemplary techniques for separating a first liquid phase from a second liquid phase in a liquid-liquid separator include gravity settling, enhanced-gravity settling, coalescing, and electrical charge. The one or more liquid-liquid separators may be designed to minimize or prevent foaming, which may be based on one or more of vessel sizing, flow rate, operating pressure, and carbon dioxide content. The liquid-liquid separators may be any suitable size, with the proviso that first-stage liquid-liquid separators 28A, 28B and second-stage liquid-liquid separators 28C, 28D are sized relative to each other to accomplish the above described functions. The sizing and design of the various liquid-liquid separators may include suitable designs for liner size, number of liners, and desired separation efficiency.

Centrifugal separation systems, such as dewaterers and hydrocyclones, are generally known in the art as those apparatuses that utilize cyclonic flow in order to separate the first liquid phase (e.g. oil) from the second liquid phase (e.g.

water). The combined liquid-liquid stream is generally fed tangentially into an upper cylindrical portion where the liquid is accelerated in a spiral as the liquid flows through a conical lower portion. As the liquid spirals, centrifugal forces draw the more dense components (e.g. water) to the outer portion of the rotating column of liquid and the less dense components (e.g. oil) of the liquid migrate to a central column area. The dense components are discharged through a lower underflow opening in the conical lower portion and the less dense components are passed upwardly through a centrally located overflow opening or outlet. As generally known in the art, centrifugal separation systems include a plurality of liners through which the liquid flows. Centrifugal separation systems may utilize any suitable number and size of the liners, where the number and size of the liners may be based on one or more of a desired flow rate and a desired oil separation.

As general description of the centrifugal separation systems referred to herein, the centrifugal separation systems include three main process streams: an inlet stream, a reject stream, and an underflow stream. The inlet stream (e.g. stream 27A) is a multiphase stream including oil, water, and some entrained gas. A reject stream is a stream (e.g. stream 30A) including a substantial amount of the oil from the inlet stream, and small amounts of water and breakout gas. An underflow stream (e.g. stream 32A) will be predominately water, with small amounts of oil. The operation of centrifugal separation systems are generally based on a delta pressure ratio (DPR), set forth in Formula I below. The DPR is based on the pressures of the three process streams described above. The DPR is a ratio of the pressure drop from the inlet stream ($P_{inlet}$) to the reject stream ($P_{reject}$) divided by the pressure drop from the inlet stream ($P_{inlet}$) to the underflow stream ($P_{underflow}$)

$$DPR = \frac{P_{inlet} - P_{reject}}{P_{inlet} - P_{underflow}} \quad \text{Formula I: Delta Pressure Ratio}$$

Suitable ratios for the DPR for centrifugal separation systems discussed herein may be generally known to the skilled person.

A predetermined DPR may also be utilized by a process control scheme to maintain a desired reject flow split from the centrifugal separation systems. Reject flow is defined as the total reject flow rate (i.e. flow rate of stream 30A) of the centrifugal separation system, with reject flow split defined as the amount of reject flow relative to the total flow rate leaving the centrifugal separation system. In one or more embodiments, the total reject flow (i.e. stream 37) is from 10% to 25%, and in other embodiments, from 10% to 20%, of the total liquid leaving all centrifugal separation systems in the process. In one or more embodiments, the total reject flow leaving dewaterers 28A, 28B is from 5% to 15%, and in other embodiments, from 5% to 12%, of the total liquid leaving dewaterers 28A, 28B. In one or more embodiments, the total reject flow leaving hydrocyclones 28C, 28D is from 2% to 10%, and in other embodiments, from 2% to 8%, of the total liquid leaving hydrocyclones 28C, 28D.

Where centrifugal separation systems are operated in parallel (e.g. dewaterers 28A, 28B), inlet control valves may be used to split the inlet stream (e.g. stream 27) between the two parallel systems, such as shown in FIG. 3. Additional control valves on the reject streams of the centrifugal separation systems may be utilized and adjusted to maintain a desired reject flow split set point based on a predetermined DPR.

For further characterization of the differences between dewaterers 28A, 28B and hydrocyclones 28C, 28D, in general, dewaterers 28A, 28B utilize fewer liners and larger liner sizes than hydrocyclones 28C, 28D. As discussed above, dewaterers 28A, 28B are designed to remove a bulk amount of oil and hydrocyclones 28C, 28D are intended as a polishing step. In one or more embodiments, the size of the liners of dewaterers 28A, 28B is 10 times, or approximate thereto, the size of the liners of hydrocyclones 28C, 28D.

Dewaterers 28A, 28B may be characterized by separation efficiency of the first liquid phase from the second liquid phase. In one or more embodiments, dewaterers (e.g. dewaterers 28A, 28B) remove 90% or more, in other embodiments, 95% or more, and in other embodiments, 98% or more, of the first liquid phase (e.g. oil) from the second liquid phase (e.g. water). Dewaterers (e.g. dewaterers 28A, 28B) are generally configured to handle and separate inlet streams with higher concentrations of the liquid to be separated. For example, in one or more embodiments, an inlet stream (e.g. stream 27A) may include from 25,000 ppm to 75,000 ppm, in other embodiments, 40,000 ppm to 60,000 ppm, and in other embodiments, 50,000 ppm or approximate thereto, oil. In one or more embodiments, dewaterers (e.g. dewaters 28A, 28B) provide a water-rich, oil-lean outlet stream (e.g stream 32A) having 3,000 ppm or less, in other embodiments, 2,000 ppm or less, in other embodiments, 1,000 ppm or less, and in other embodiments, 500 ppm or less, oil.

Hydrocyclones 28C, 28D may be characterized by separation efficiency of the first liquid phase from the second liquid phase. In one or more embodiments, hydrocyclones (e.g. hydrocyclones 28C, 28D) remove 98% or more, in other embodiments, 99% or more, and in other embodiments, 99.5% or more, of the first liquid phase (e.g. oil) from the second liquid phase (e.g. water). Hydrocyclones (e.g. hydrocyclones 28C, 28D) are generally configured to handle and separate inlet streams with lower concentrations of the liquid to be separated. For example, in one or more embodiments, an inlet stream (e.g. stream 32A) may include from 1,000 ppm to 10,000 ppm, in other embodiments, 2,000 ppm to 10,000 ppm, in other embodiments, 4,000 ppm to 6,000 ppm, in other embodiments, from 1,000 ppm to 2,000 ppm in other embodiments, 5,000 ppm or approximate thereto, and in other embodiments, less than 5,000 ppm, oil. In one or more embodiments, hydrocyclones (e.g. hydrocyclones 28C, 28D) provide a water-rich, oil-lean outlet stream (e.g. stream 32C) having 300 ppm or less, in other embodiments, 150 ppm or less, in other embodiments, 100 ppm or less, in other embodiments, 50 ppm or less, in other embodiments, from 50 ppm to 150 ppm, and in other embodiments, 50 ppm to 100 ppm oil.

With further reference to FIG. 3, in certain embodiments, a valve 35 may be provided and adjusted such that at least a portion and up to the entirety of water-rich, oil-lean stream 32A may be provided to hydrocyclone 28D. Valve 35 may also be adjusted such that at least a portion and up to the entirety of water-rich, oil-lean stream 32B may be provided to hydrocyclone 28C. This adjustment of valve 35 may be done as process operations (e.g. scheduled maintenance) require.

For further processing, further oil-rich, water-lean, gas-lean stream 30C and further oil-rich, water-lean, gas-lean stream 30D may be combined with oil-rich, water-lean, gas-lean streams 30A, 30B to form a combined oil-rich, water-lean, gas-lean stream 37. Stream 37 may be provided to tank battery 33 for further separation of water and oil in stream 37 and utilization of the separated oil as a crude oil stream. For further processing, further water-rich, oil-lean stream 32C and further water-rich, oil-lean stream 32D may combine with water-rich, oil-lean stream 32A, 32B to form a combined water-rich, oil-lean stream 39. Stream 39 may be provided to one or more injection pumps 34 for injecting a pressurized stream 36 into one or more injection wells 38.

Water-rich, oil-lean stream 39 may be characterized by the amount of carbon dioxide in stream 39. In one or more embodiments, water-rich, oil-lean stream 39 provided to one or more injection pumps includes 12 scf/BBL or more, in other embodiments, 61 scf/BBL or more, and in other embodiments, 94 scf/BBL or more, carbon dioxide. In one or more embodiments, water-rich, oil-lean stream 39 includes 131 scf/BBL or less, in other embodiments, 120 scf/BBL or less, in other embodiments, 111 scf/BBL or less, carbon dioxide. Any of these numbers may be utilized to form suitable ranges. For example, in one or more embodiments, water-rich, oil-lean stream 39 includes from 12 scf/BBL or more to 131 scf/BBL or less, in other embodiments, from 61 scf/BBL or more to 120 scf/BBL or less, and in other embodiments, from 94 scf/BBL or more to 111 scf/BBL or less, carbon dioxide.

The content of carbon dioxide within water-rich, oil-lean stream 39 may also be referred to as a percentage of the carbon dioxide in relation to a prior process stream (e.g. stream 26). For example, if a prior process stream (e.g. stream 26) includes 141 scf carbon dioxide per BBL, and the outlet stream of the separation process (i.e. water-rich, oil-lean stream 39) includes 131 scf carbon dioxide per BBL, the carbon dioxide content in the outlet stream may be said to be 93 percent of the carbon dioxide in the prior stream (i.e. stream 26). In one or more embodiments, the carbon dioxide content in an outlet stream (i.e. water-rich, oil-lean stream 39) is 38 percent or more, in other embodiments, 79 percent or more, in other embodiments, 87 percent or more, of the carbon dioxide from a prior process stream (i.e. stream 26).

This carbon dioxide content of water-rich, oil-lean stream 39 may also be quantified based upon a gas volume fraction, which is the ratio of the gas (e.g. carbon dioxide) volumetric flow rate to the total volumetric flow rate. In one or more embodiments, water-rich, oil-lean stream 39 has a gas volume fraction of less than 20%, in other embodiments, less than 15%, in other embodiments, less than 10%, in other embodiments, less than 5%, and in other embodiments, from 8% to 10%.

Based on the presence of carbon dioxide in pressurized, water-rich stream 39, one or more injection pumps 34 may be designed to handle potential issues caused by the carbon dioxide gas, such as cavitation of a centrifugal pump impeller. This may include manufacturing one or more injection pumps 34, particularly the impellers thereof, from higher-grade materials generally known to the skilled person. An exemplary higher-grade material is nickel aluminum bronze alloy. In other embodiments, one or more injection pumps 34, particularly the impellers thereof, may be made from stainless steel. One or more embodiments may also include manufacturing one or more injection pumps 34 with particular sizing to mitigate or eliminate any issues caused by the carbon dioxide. In one or more embodiments, one or more injection pumps 34 may be H-Pumps or Split Case pumps.

One or more injection pumps 34 may be characterized by the operating pressure thereof, particularly the inlet pressure. In one or more embodiments, one or more injection pumps 34 has an inlet pressure of 382 psig or less, in other embodiments, 362 psig or less, in other embodiments, 250 psig or less, in other embodiments, 200 psig or less, in other embodiments, 150 psig or less, and in other embodiments, 100 psig or less. In one or more embodiments, one or more injection pumps 34 has an inlet pressure of 20 psig or more, in other embodiments, 62 psig or more, in other embodiments, 112 psig or more, in other embodiments, 150 psig or more, and in other embodiments, 200 psig or more. Any of these numbers may be utilized to form suitable ranges.

One or more injection pumps 34 may include a pressure control valve and a variable-frequency drive (VFD) to control the injection rate of one or more injection pumps 34. Pressure control valves and variable-frequency drives are generally known to those skilled in the art. The pressure control valve may be utilized to prevent one or more injection pumps 34 from running outside of the operating envelope. The VFD may be utilized to vary the speed of one or more injection pumps 34. The VFD may be utilized to maintain a liquid level set point in the production separator within +/−10%.

One or more injection wells 38 may be any suitable location for storing or utilizing a water-rich stream (e.g. stream 36). In one or more embodiments, one or more injection wells 38 may be a depleted reservoir. In one or more embodiments, one or more injection wells 38 may be an abandoned oil or gas well. In one or more embodiments, one or more injection wells 38 may be an active reservoir, for example, where water flooding is particularly desired. In one or more embodiments, one or more injection wells 38 may be in the same location as one or more oil and gas production wells 16.

Similar to the discussion above with respect to FIG. 2, embodiments of separation process 15B retain significant levels of the carbon dioxide that is absorbed in liquid-rich, gas-lean stream 26 within pressurized stream 36. That is, based on the elevated operation pressure of process 15B, an appreciable amount of the carbon dioxide within liquid-rich, gas-lean stream 26 can be retained in stream 36 and subsequently injected into one or more injection wells 38. Though the carbon dioxide content of liquid-rich, gas-lean stream 26 may vary based on the composition of stream 17 and the process conditions of process 15B, embodiments of process 15B retain a significant amount of the carbon dioxide from stream 26 within stream 36 for injection. In one or more embodiments, 70% or more, in other embodiments, 80% or more, in other embodiments, 90% or more, in other embodiments, 92% or more, and in other embodiments, 94% or more, of the carbon dioxide in stream 26 is retained in pressurized stream 36. In these or other embodiments, up to 96% of the carbon dioxide in stream 26 is retained in pressurized stream 36.

In one or more embodiments, the elevated operation pressure of process 15B that gives rise to the advantageous amount of carbon dioxide retained in stream 36 may include the operating pressure of the production stream (i.e. stream 17 continuing to stream 36) staying above a predetermined pressure. In one or more embodiments, the operating pressure of the production stream (i.e. stream 17 continuing to stream 36) is above 150 psig, in other embodiments, above 200 psig, and in other embodiments, above 250 psig, throughout the entirety of separation process 15B. These elevated pressures serve to retain a desired amount of the carbon dioxide in multiphase production stream 17 and stream 26 within pressurized stream 36. The desired amount of carbon dioxide retained within pressurized stream 36 may be defined in terms of standard cubic feet carbon dioxide (scf) per barrels (BBL) of total liquid fluid (e.g. water) (scf/BBL). In one or more embodiments, pressurized stream 36 is a water stream having 80 or more scf/BBL, in other embodiments, 95 or more scf/BBL, in other embodiments, 110 or more scf/BBL, in other embodiments, 120 or more scf/BBL, and in other embodiments, 130 or more scf/BBL, carbon dioxide absorbed therein. In these or other embodiments, pressurized stream 36 is a water stream having 150 or less scf/BBL, in other embodiments, 140 or less scf/BBL, in other embodiments, 120 or less scf/BBL, and in other embodiments, 100 or less scf/BBL, carbon dioxide absorbed therein. Any of the above end-point numbers may be utilized to form suitable ranges.

With further reference to FIG. 3, in certain embodiments, recycle stream 21 may be taken from an injection pump outlet stream 41. Recycle stream 21 may be utilized to provide a minimum or desired flow rate through process 15B, such as when the flow rate of stream 17 is low. Recycle stream 21 may also be utilized to maintain a desired liquid level in production separator 22. As such, recycle stream 21 may include a flow control signal (not shown) coupled with a level measurement in production separator 22.

One or more embodiments include an oil-in-water analyzer 42 for measuring the amount of oil in injection pump outlet stream 41. As discussed above, stream 41 is the pump outlet stream with water-rich, oil-lean stream 39 as the pump inlet stream. As also discussed above (with reference to hydrocyclone outlet stream 32C), in one or more embodiments, stream 41 desirably includes oil in an amount of 300 ppm or less. Suitable analyzers for oil-in-water analyzer 42 are generally known to the skilled person. An exemplary oil-in-water analyzer 42 uses fluorescence technology to determine oil-in-water amounts in a range of 0 to 500 parts per million (ppm). Oil-in-water analyzer 42 may be used as a quality check of process 15B to ensure that stream 41 does not include more than a desired amount of oil.

Skid Overview

Figure 4:
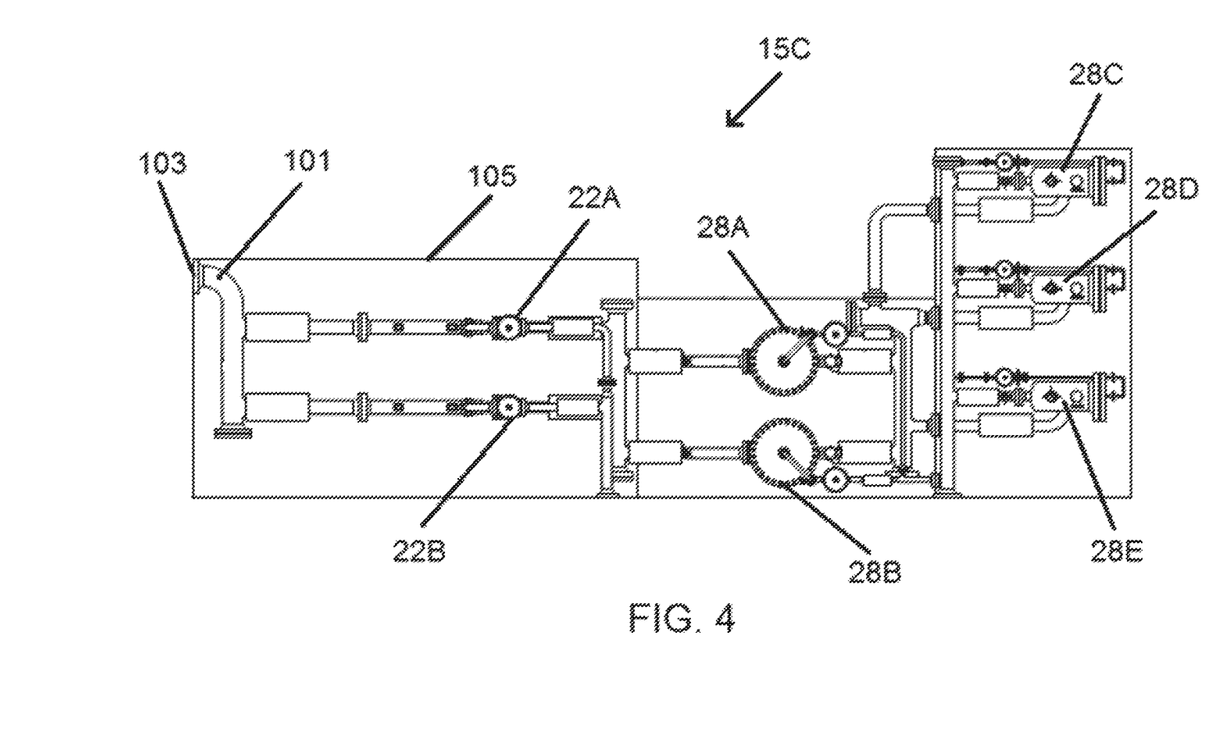
FIG. 4 is a schematic, top view showing one or more embodiments of the invention.

With reference to FIG. 4, one or more embodiments of the invention include a system 15C for carrying out a separation process. System 15C, which may also be referred to as a separation skid 15C, may include one or components of processes 15, 15B discussed above. For example, as shown in FIG. 4, skid 15C includes an inlet piping 101 with a flange 103 for securing skid 15C to a process flange and corresponding process piping (not shown in FIG. 4). Process flange and corresponding process piping may be in close proximity to an existing tank battery, which may be defined as 500 feet or less. Once coupled with the process flange and piping, inlet piping 101 may be adapted to receive a production stream from a production well. In one or more embodiments, the production stream may be provided to one or more gas-liquid separators prior to being provided to inlet piping 101 in order to remove at least a majority of the gas phase. The production stream including oil, hydrocarbon gas, carbon dioxide, and water may then be provided to one or more gas-liquid separators 22A, 22B for separation of additional gas phase within the production stream. One or more gas-liquid separators 22A, 22B separate the production stream into a gas-rich, liquid-lean stream and a liquid-rich, gas-lean production stream. The liquid-rich, gas-lean production stream is provided to one or more dewaterers 28A, 28B. One or more dewaterers 28A, 28B provide a water-rich, oil-lean stream to one or more hydrocyclones 28C, 28D, 28E for further separation of oil from the water-rich stream.

One or more gas-liquid separators 22A, 22B, one or more dewaterers 28A, 28B, and one or more hydrocyclones 28C, 28D, 28E may be coupled with and provided on a support base 105. As such, skid 15C may be easily transported from a first location to a second location. Support base 105, which may also be referred to as frame 105, may include one or more attachment points for hooks, chains, or cables for ease in transport. Support base 105 may include one or more lengthwise beams to facilitate moving skid 15C into place at a particular location.

Phase Splitters

Figure 5:
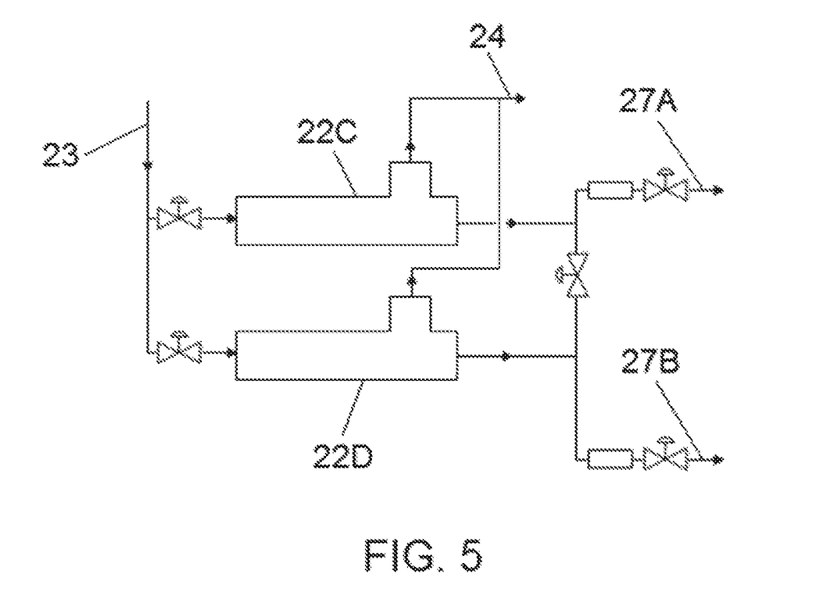
FIG. 5 is a flow chart showing one or more embodiments of the invention.

With reference to FIG. 5, in certain embodiments of the invention, the one or more gas-liquid separators 22 discussed above (i.e. in FIG. 3) includes two or more phase splitters 22C, 22D. As used herein, the term "phase splitter" may refer to those apparatuses that separate gas from oil by gravity using relatively small dimensions (i.e. comparable to the piping to which it is coupled) and without using advanced control schemes. Phase splitters may also be referred to as a single stage cyclone where a swirl element generates a cyclonic flow generating the force required to establish a gas core in the center and a liquid film near the pipe wall. The gas can be extracted from the center and the liquid can be extracted from the annular film. It should be appreciated that the remaining components and streams of FIG. 3 (i.e. prior to stream 23 and subsequent to streams 27A, 27B) may also be utilized with the one or more embodiments of FIG. 5 utilizing two or more phase splitters 22C, 22D.

Three-Phase Separator

Figure 6:
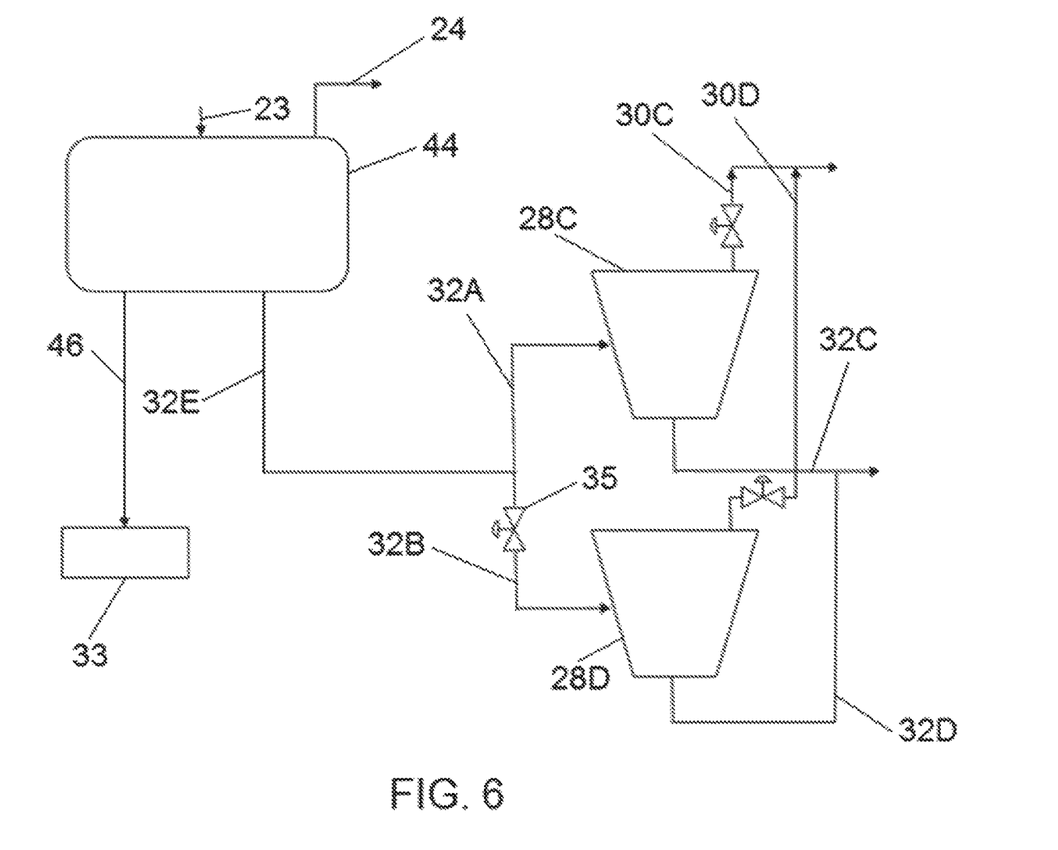
FIG. 6 is a flow chart showing one or more embodiments of the invention.

With reference to FIG. 6, in certain embodiments of the invention, the one or more gas-liquid separators 22 discussed above (i.e. in FIG. 3) may be replaced with one or more three-phase separators 44. Three-phase separator 44 separates stream 23 into a gas-rich, liquid-lean stream 24, a water-rich, oil-lean stream 32E, and an oil-rich, water-lean, gas-lean stream 46. Water-rich, oil-lean stream 32E may be separated into a first water-rich, oil-lean stream 32A provided to hydrocyclone 28C and a second water-rich, oil-lean stream 32B provided to hydrocyclone 28D, corresponding with FIG. 3. As should be appreciated from FIG. 6, the utilization of one or more three-phase separators 44 may replace the need for dewaterers 28A, 28B.

As discussed above, hydrocyclone 28C may separate water-rich, oil-lean stream 32A into a further oil-rich, water-lean, gas-lean stream 30C and a further water-rich, oil-lean stream 32C, and hydrocyclone 28D may separate water-rich, oil-lean stream 32B into a further oil-rich, water-lean, gas-lean stream 30D and a further water-rich, oil-lean stream 32D. Oil-rich, water-lean, gas-lean stream 46 may be provided to tank battery 33 for further separation of water and utilization of the oil as a crude oil stream. It should be appreciated that the remaining components and streams of FIG. 3 (i.e. prior to stream 23 and subsequent to streams 30C, 30D, 32C, 32D) may also be utilized with the one or more embodiments of FIG. 6 utilizing one or more three-phase separators 44.

Advantages

Carbon Dioxide

As discussed herein, embodiments of the invention advantageously retain a significant amount of the carbon dioxide in an inlet stream within a subsequent outlet stream for injection of the carbon dioxide downhole.

Tank Battery Capacity

Based on the lack of need to accumulate large amounts of water above ground, embodiments of the present invention may be capable of reducing the capacity of a tank battery compared to known processes for managing the carbon dioxide in a production stream. In one or more embodiments, a process according to embodiments of the invention may reduce the required tank capacity of a tank battery by greater than 75%, in other embodiments, greater than 85%, compared to known processes for managing the carbon dioxide in a production stream.

Gas Compression Savings

Based on retaining significant amounts of carbon dioxide within a subsequent injection stream, embodiments of the present invention may be capable of reducing the gas compression requirements as compared to known processes for managing the carbon dioxide in a production stream. As generally known, there may be two stages of gas compression: a low pressure compression stage and a high pressure compression stage. One or more embodiments of the present invention may reduce the low pressure compression requirements by 30% to 50% compared to known processes for managing the carbon dioxide in a production stream.

Various modifications and alterations that do not depart from the scope and spirit of this invention will become apparent to those skilled in the art. This invention is not to be duly limited to the illustrative embodiments set forth herein.

What is claimed is:

1. A method of separating hydrocarbons from an oil field production stream comprising steps of:
   (i) providing a production stream having a gas phase and a liquid phase, the production stream including oil, hydrocarbon gas, carbon dioxide, and water;
   (ii) providing the production stream to a gas-liquid separator to separate the gas phase from the liquid phase, the separated liquid phase including oil and water, the water having carbon dioxide gas absorbed therein;
   (iii) providing the separated liquid phase to a liquid-liquid separator to separate the oil from the water, to form a water stream having the carbon dioxide absorbed therein;
   (iv) providing the water stream having the carbon dioxide absorbed therein to an injection pump to form a pressurized water stream; and
   (v) providing the pressurized water stream to an injection well;
   wherein the method includes operating each step at a pressure above 150 psig.

2. The method of claim 1, wherein the step of providing the separated liquid phase to a liquid-liquid separator includes providing the separated liquid phase to a first liquid-liquid separator to thereby obtain a first water-rich stream, and providing the first water-rich stream to a second liquid-liquid separator in sequence with the first liquid-liquid separator to thereby obtain a second water-rich stream.

3. The method of claim 2, wherein the separated liquid phase provided to the first liquid-liquid separator includes from 25,000 ppm to 75,000 ppm oil.

4. The method of claim 3, wherein the first water-rich stream provided to the second liquid-liquid separator includes from 1,000 ppm to 2,000 ppm oil.

5. The method of claim 4, wherein the second water-rich stream exiting the second liquid-liquid separator includes 300 ppm or less oil.

6. The method of claim 2, wherein at least 90% of the carbon dioxide within the separated liquid phase is retained within the pressurized water stream.

7. The method of claim 6, wherein at least 94% of the carbon dioxide within the separated liquid phase is retained within the pressurized water stream.

8. The method of claim 1, wherein the method includes operating each step at a pressure above 200 psig.

9. The method of claim 1, further including a step of a multiphase flowmeter providing signal back to a production well in order to maintain a desired flow rate of the production stream.

10. The method of claim 1, wherein the pressurized water stream includes from 80 SCF/BBL to 140 SCF/BBL or less carbon dioxide absorbed therein.

11. A method of separating hydrocarbons from an oil field production stream comprising steps of:
   (i) providing a production stream having a gas phase and a liquid phase, the production stream including oil, hydrocarbon gas, carbon dioxide, and water;
   (ii) separating the gas phase from the liquid phase;
   (iii) separating the liquid phase into an oil stream and a water stream, the water stream containing carbon dioxide absorbed therein;
   (iv) pressurizing the water stream containing carbon dioxide absorbed therein; and
   (v) injecting the pressurized water stream containing carbon dioxide absorbed therein to a downhole injection location;
   wherein the method includes operating each step at a pressure above 150 psig.

12. The method of claim 11, wherein the method includes operating each step at a pressure above 200 psig.

13. The method of claim 11, further including a step of a multiphase flowmeter providing signal back to a production well in order to maintain a desired flow rate of the production stream.

14. The method of claim 11, wherein the oil stream includes oil, hydrocarbon gas, carbon dioxide, and water.

15. The method of claim 11, wherein the water stream includes water, 30 ppm or less of oil, and dissolved carbon dioxide.

16. The method of claim 11, wherein the step of injecting includes injecting the stream into the same well location as where the production stream is obtained.

17. The method of claim 11, wherein the pressurized water stream includes from 80 SCF/BBL to 140 SCF/BBL carbon dioxide absorbed therein.

18. The method of claim 11, wherein the steps of separating the gas phase from the liquid phase and separating the liquid phase into an oil stream and a water stream each occur within a three-phase separator.

19. The method of claim 18, further comprising, following the three-phase separator, a step of providing the water stream to a liquid-liquid separator.

* * * * *